United States Patent Office 3,091,599
Patented May 28, 1963

3,091,599
VAPOR PHASE POLYMERIZATION OF FORMALDEHYDE
Henri Jean, Palaiseau, France, assignor to Compagnie de St. Gobain, Paris, France
No Drawing. Filed Sept. 15, 1959, Ser. No. 840,012
Claims priority, application France Sept. 24, 1958
14 Claims. (Cl. 260—67)

This invention relates to the manufacture of polymers of formaldehyde. It concerns a gas phase process for polymerizing formaldehyde. The invention also concerns novel methods of conducting gas phased polymerizations of various monomers.

It has been suggested to prepare formaldehyde polymers of high molecular weight by the polymerization of formaldehyde in the absence of solvents and diluents, in liquid phase, at a temperature on the order of −80° C. It has also been proposed to carry out the polymerization in solution by dissolving gaseous formaldehyde at a low temperature in an appropriate solvent and submitting the solution, with or without a catalyst, to conditions of polymerization such as by heating to room temperature. In both cases the quality of the product is mediocre.

In order to attempt the preparation of polymers of better quality it has been suggested to change the second of the foregoing processes by passing gaseous formaldehyde continuously into a liquid polymerization medium, for example, an aliphatic hydrocarbon, with agitation, with or without a catalyst. That process produces a sludge formed by the liquid hydrocarbon holding the polymer in suspension. The polymer is isolated by filtration.

The practice of the foregoing methods of polymerization in liquid media always present technical difficulties, particularly because of the adherence of the polymer to the walls of the reactor during formation, which limits heat exchange through the wall and imposes the use of apparatus for cleaning the walls which complicate the apparatus and are not wholly efficient. Furthermore the polymer is obtained as a suspension in a liquid, which must be filtered, for example under vacuum, leaving a filter cake which must be washed and requiring a final drying of the powdery polymer.

It is an object of the present invention to produce polymers of formaldehyde by a gas phase polymerization. Another object is to prepare polymers of formaldehyde by a process which avoids the adherence of the polymer to the reactor walls. Another object is to prepare formaldehyde polymers by a process the temperature of which can be controlled by the rate at which the reactants are fed to the reactor. Another object is to prepare formaldehyde polymers directly as a dry powder which can be worked, molded, and shaped immediately upon formation. Another object is to prepare polymers of formaldehyde without filtration, purification, or drying.

The objects of the invention are accomplished, generally speaking, in its application to the manufacture of formaldehyde, by flowing a vapor containing a catalyst for the polymerization of formaldehyde, and formaldehyde vapor together, thereby dispersing the catalyst through the formaldehyde in a space which is maintained under conditions of temperature and pressure which are favorable to the polymerization.

In the form of the invention in which a catalyst is employed the catalyst is in the first instance dispersed in finely divided form through a propellant which is a liquid which is vaporizable, preferably explosively, at room temperature. This term explosive is not used in the technical sense of a compound which changes its chemical nature with the production of heat and light but in the sense of a sudden change of phase induced by sudden release into a space having conditions of temperature and pressure which produce an instantaneous and preferably violent vaporization of the propellant. In view of this violent change of phase liquid catalyst suspended in the propellant is minutely vaporized, for instance gaseous and solid catalysts suspended in the propellant are subjected to disintegrating forces which tend to open them up and disperse them in yet smaller particles.

It is also possible to suspend the formaldehyde in a propellant and to project the suspension into a space which does or does not contain a catalyst but which is in either case maintained under conditions of temperature and pressure which are favorable to polymerization.

In the commercial method of carrying out the invention, formaldehyde in gas phase flows as a continuous stream into a reaction chamber into which one simultaneously introduces a polymerization catalyst as a gas, vapor, or aerosol. The polymer which forms is deposited in the bottom of the reaction space in the form of a dry powder of very fine particle size which does not adhere to the walls of the reaction space. The reaction space is preferably maintained between −50° C. and +80° C., which constitute about the lower and upper limits of the range, but we have demonstrated that temperatures between −50° C. and +50° C. are particularly efficacious. The reaction proceeds satisfactorily at atmospheric pressure.

The catalysts used in this process include particularly the tertiary aliphatic amines, which are already known as catalyzers for the polymerization of formaldehyde. These amines can be directly introduced in gas form by simple volatilization of the amine. In this form of the invention the use of a propellant is unnecessary. However, in another and preferred form of the invention the tertiary aliphatic amines in finely divided form are dispersed in a solvent which vaporizes readily within the temperature range at which the polymerization proceeds, forming an aerosol. This form of the invention has the particular advantage that the volatile solvent introduced into the reactant in finely divided and dispersed form acts efficiently to absorb by means of its latent heat of vaporization the heat which is released by the reaction. In this preferred form of the invention one can easily regulate the temperature of the reaction so as to obtain a pre-selected degree by regulating the quantities of catalyst solution admitted to the reactor with respect to the amount of formaldehyde monomer which is admitted. This enables the operator to keep the main reaction below the temperature at which side reactions occur, without exterior cooling and by an internal cooling which acts in the very space in which the polymerization is proceeding. This has the effect of producing polymers of exceptionally uniform quality.

The process produces high polymers of formaldehyde which have physical and mechanical properties comparable to the best that can be obtained in liquid phase. The polymers produced by this process can be shaped by the usual methods applicable to thermoplastic resins such as molding, extrustion, and drawing into fibers to yield objects having a softening point near or higher than 180° C., which gives these products wide application.

The reaction chamber should be large enough to permit the polymerization to proceed in the space within it largely without touching the walls. This prevents the formation of layers of polymer upon the reactor walls. It constitutes an advantage of this invention and eliminates one of the principal imperfections of the polymerization in mass or in liquid phase.

Another advantage of the process is the ease with which the temperature inside the reactor can be controlled, not only by the rate at which gaseous formaldehyde is admitted to the chamber but by the rate at which the catalyst solution is admitted. The regulation of the reaction temperature is equally facilitated in the process of the invention by the fact that the heat of reaction is absorbed by the volatilization of the solvent of the catalyst, the heat of vaporization of which is much higher than the specific heat.

The process of the invention also possesses the considerable advantage that solid polymer powders are produced free from solvents and are directly useful.

The process of the invention is particularly adapted to continuous manufacture because thermal exchanges are easily affected without need of any control other than the regulation of the input of monomer and of catalyst solution. The polymer falls to the lower part of the apparatus and is easily extracted periodically or continuously.

Among the particular catalysts which are highly useful are tributylamine, trihexylamine, dimethyloctadecylamine, cyclohexyldibutylamine and diethylcyclohexylamine. These amines are preferably used in proportions of 1 to 15 molecules for each 3000 molecules of formaldehyde. These amines may be used pure as vapors or under the form of aerosols of their solutions in convenient volatile solvents. These solvents should not dissolve the polymers formed at the temperature of reaction and should be sufficiently volatile to change to the vapor state at the reaction temperature. Among the useful propellants of this sort are hydrocarbons which are not polymerizable and which preferably no not include halogen. In particular the aliphatic hydrocarbons which have a boiling point below about 80° are useful.

When the amine is used in solution in such a solvent one preferably uses a proportion on the order of .0001 to .005 mole of amine for each 100 grams of solution. The following examples illustrate the invention.

Example 1

A cylindrical reaction chamber having its axis vertical and dimensions 60 centimeters of diameter and 135 centimeters of height, is provided at its upper part with spray nozzles situated close to the axis of the reactor, to one of which gaseous formaldehyde is directed and to the other of which a catalyst, is led. At the lower part of the reactor there is an opening which permits the escape of polymer powder and of gases.

The reactor is first freed of air by filling it with nitrogen, then 900 grams per hour of gaseous formaldehyde is forced through one nozzle while 6.7 liters per hour of a solution of tri-n-butylamine in n-pentane are forced through the other nozzle. The concentration of amine in hydrocarbon is 19 grams per 6.7 liters. The heat liberated by the reaction of polymerization completely vaporizes the pentane which escapes through the opening provided for that purpose in the bottom of the apparatus. It is conducted to a condenser and recovered.

The internal temperature of the reactor is maintained around 30° without need of heating or exterior cooling.

The polymer is formed and is deposited continually in the lower part of the apparatus as a dry powder that is periodically removed. It does not collect on the walls of the cylinder. The yield of polymerization is approximately that which is theoretically possible. The polyformaldehyde powder which is thus obtained may be molded by compression at 215° for 5 minutes under a pressure of 60 kilograms per square centimeter to give films 0.1 millimeter thick which resist more than 100 cycles of bending.

The inherent viscosity as defined by Craig, Journal of Colloid Science, vol. 1, page 261 to 269, 1946, measured at a concentration of .5 percent at 60° C. in tetrachlorophenol containing 2 percent by weight of alphapinen, is 2.3.

The speed of decomposition of the polymer at 222° C. is .65 percent per minute of the weight of the residual polymer.

The solubility of the polymer in a normal solution of sodium sulfite is only .25 percent.

The product may be extruded at 215° C. in strong flexible threads .5 millimeter in diameter at a pressure of 150 kilograms per square centimeter.

The invention includes the production of formaldehyde polymers by carrying out the polymerization in gas phase by introducing into a reaction chamber simultaneously a continuous current of formaldehyde monomer in gas phase and a catalyst for the polymerization in the form of vapor or aerosol, the polymer formed being recovered as a dry powder below the locus of polymerization. The aliphatic tertiary amines are satisfactory catalysts and may be introduced into the reaction chamber in gas form by simple volatilization of the amine or they can be dissolved in a volatile solvent and injected as an aerosol. The temperature in the reaction zone is controlled by regulating the quantities of gaseous formaldehyde and catalyst or catalyst solution which are admitted to the reaction space.

Although only a limited number of embodiments of the invention have been described in the foregoing specification, it is to be expressly understood that various changes, such as in the relative dimensions in the parts, materials used, and the like as well as the suggested manner of use of the apparatus of the invention, may be made therein without departing from the spirit and scope of the invention as will now be apparent to those skilled in the art.

What is claimed is:

1. The method of polymerizing formaldehyde with the production of high polymers which comprises mixing vapors of formaldehyde with a catalyst vapor comprising a tertiary aliphatic amine in an inert atmosphere.

2. The method of polymerizing formaldehyde with the production of high polymers which comprises flowing a vapor containing a catalyst, comprising an aliphatic tertiary amine, for the polymerization of formaldehyde and formaldehyde vapor together thereby dispersing the catalyst through the formaldehyde.

3. The method of polymerizing formaldehyde with the production of high polymers which comprises mixing vapors of formaldehyde with a catalyst vapor comprising a tertiary aliphatic amine, the quantity of catalyst used being in the ratio of 1 to 15 moles per 3000 moles of formaldehyde.

4. The method of polymerizing formaldehyde with the production of high polymers which comprises flowing a vapor containing a catalyst for the polymerization of formaldehyde and formaldehyde vapor together thereby dispersing the catalyst through the formaldehyde, the vaporous catalyst comprising an aerosol propellant and an aliphatic tertiary amine.

5. The method of polymerizing formaldehyde with the production of high polymers which comprises flowing a vapor containing a catalyst for the polymerization of formaldehyde and formaldehyde vapor together thereby dispersing the catalyst through the formaldehyde, the vaporous catalyst comprising an aerosol propellant and an aliphatic tertiary amine, the propellant consisting essentially of an aliphatic hydrocarbon boiling below about 80° C.

6. The process of claim 2 in which the temperature is maintained between about −50° C. and 80° C.

7. The process of claim 6 in which the temperature is regulated by controlling the relative amounts of the two vapors admixed.

8. A method of polymerizing formaldehyde which comprises mixing vapors of formaldehyde with a vapor comprising an aliphatic tertiary amine and an inert solvent for the amine in a space maintained at atmospheric pressure and a temperature between −50° C. and +80° C.

9. A method of polymerizing formaldehyde which comprises mixing vapors of formaldehyde with the vapors of a catalyst comprising a tertiary aliphatic amine in a space maintained at atmospheric pressure and a temperature between —50° C. and +80° C.

10. The method of claim 8 in which the tertiary amine is present in a ratio of 1 to 15 moles per 3000 moles of formaldehyde.

11. The method of polymerizing formaldehyde which comprises introducing a stream of gaseous formaldehyde into a space maintained at —50° C. to +80° C. and vaporizing an aerosol solution of a catalyst for the polymerization of formaldehyde in situ in a proportion of 1 to 15 moles of catalyst per 3000 moles of formaldehyde.

12. A method of preparing high molecular weight polymers of formaldehyde which comprises dispersing a tertiary aliphatic amine catalyst in a liquid aerosol propellant which vaporizes violently between —50 and +80° C., flowing gaseous formaldehyde into a reaction space at a temperature between —50 and +80° C., vaporizing the catalyst dispersion in the reaction space in contact with the formaldehyde, thus forming high polymers of formaldehyde, and receiving the high polymer on a non-gaseous body below the reaction space after its formation.

13. A method of preparing high molecular weight polymers of formaldehyde which comprises dispersing a tertiary amine catalyst in a liquid aerosol propellant which vaporizes violently between —50 and +80° C., flowing gaseous formaldehyde into a reaction space at a temperature between —50 and +80° C., vaporizing the catalyst dispersion in the reaction space in contact with the formaldehyde, thus forming high polymers of formaldehyde, and receiving the high polymer on a non-gaseous body below the reaction space after its formation.

14. A method of preparing high molecular weight polymers of formaldehyde which comprises dispersing a catalyst for the polymerization of formaldehyde which is capable of forming an aerosol in a liquid aerosol propellant which vaporizes violently between —50 and +80° C., flowing gaseous formaldehyde into a reaction space at a temperature between —50 and +80° C., vaporizing the catalyst dispersion in the reaction space in contact with the formaldehyde, thus forming high polymers of formaldehyde, and receiving the high polymer on a non-gaseous body below the reaction space after its formation.

References Cited in the file of this patent

UNITED STATES PATENTS

| 2,280,802 | Depew | Apr. 28, 1942 |
| 2,704,765 | Smithson | Mar. 22, 1955 |
| 2,768,994 | MacDonald | Oct. 30, 1956 |
| 2,841,570 | MacDonald | July 1, 1958 |

OTHER REFERENCES

Walker: Formaldehyde, A.C.S. Mono. No. 120 (1953), pages 34–36.

Walker: Formaldehyde (1953), pp. 152–3.

Bevington et al.: Proc. Royal Society, vol. A205 (1951), pp. 516–529.